US010523857B2

(12) United States Patent
Midorikawa

(10) Patent No.: US 10,523,857 B2
(45) Date of Patent: Dec. 31, 2019

(54) IMAGING DEVICE REMOTELY CONTROLLABLE FROM EXTERNAL DEVICE, METHOD FOR CONTROLLING IMAGING DEVICE, AND RECORDING MEDIUM

(71) Applicant: CANON KABUSHIKI KAISHA, Tokyo (JP)

(72) Inventor: Kentarou Midorikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 15/821,548

(22) Filed: Nov. 22, 2017

(65) Prior Publication Data

US 2018/0152615 A1 May 31, 2018

(30) Foreign Application Priority Data

Nov. 30, 2016 (JP) ................................ 2016-233253

(51) Int. Cl.
*H04N 5/232* (2006.01)
*H04W 4/80* (2018.01)

(52) U.S. Cl.
CPC .......... *H04N 5/23203* (2013.01); *H04W 4/80* (2018.02)

(58) Field of Classification Search
CPC .... G03B 17/38; G03B 17/40; H04N 5/23203; H04N 5/232; H04N 5/0733; H04N 5/23206; H04N 5/232061
See application file for complete search history.

(56) References Cited

U.S. PATENT DOCUMENTS

| | | | | |
|---|---|---|---|---|
| 9,497,369 | B1 * | 11/2016 | Lin | H04N 5/2252 |
| 2011/0129207 | A1 * | 6/2011 | King | G03B 15/05 396/56 |
| 2013/0287382 | A1 * | 10/2013 | Xiao | H04N 5/23203 396/59 |
| 2014/0375862 | A1 * | 12/2014 | Kim | H04N 5/23245 348/333.02 |
| 2015/0042830 | A1 * | 2/2015 | Reid | F16M 11/00 348/211.7 |
| 2016/0091139 | A1 * | 3/2016 | Levine | F16M 13/04 294/139 |
| 2016/0301849 | A1 * | 10/2016 | E | H04M 1/72533 |

FOREIGN PATENT DOCUMENTS

JP 2015-118183 A 6/2015

* cited by examiner

*Primary Examiner* — Kelly L Jerabek
(74) *Attorney, Agent, or Firm* — Canon U.S.A., Inc. IP Division

(57) ABSTRACT

An imaging device includes an imaging unit, a control unit that controls an imaging process that uses the imaging unit, a communication unit that communicates with an external device, and a communication control unit that, upon receipt of a press state of an image capture command button on the external device, provides the control unit with the press state. If the image capture command button is indicated as being pressed, the communication control unit provides the control unit with the press state in response to receipt of the press state. If the image capture command button is indicated as being not pressed, the communication control unit provides the control unit with the press state after a predetermined time period elapses.

20 Claims, 5 Drawing Sheets

IMAGING DEVICE REMOTELY CONTROLLABLE FROM EXTERNAL DEVICE, METHOD FOR CONTROLLING IMAGING DEVICE, AND RECORDING MEDIUM

BACKGROUND

Field

The present disclosure relates to an imaging device remotely controllable from an external device.

Description of the Related Art

In recent years, improvement in functions of a digital camera has been accomplished by incorporating multiple control units therein to provide increase in speed and in stability of processing. In addition, a digital camera has been remotely manipulated from an external device to perform remote image capturing (see Japanese Patent Laid-Open No. 2015-118183).

A quick response to a user operation is preferred during remote control, and in recent communication services, information can be exchanged at a high frequency with an interval as short as several tens of milliseconds. However, analysis of received data and use of the result thereof in actual processing requires a certain period of time, which can prevent information from being processed within a communication interval. In this case, a process will not be performed as the user input. This means that the user can experience an unintended operation.

SUMMARY

Aspects of the present disclosure provide an imaging device that includes an imaging unit, a control unit configured to control an imaging process that uses the imaging unit, a communication unit configured to communicate with an external device, and a communication control unit configured to, upon receipt of a press state of an image capture command button provided on the external device, provide the control unit with the press state. The control unit controls the imaging process based on the provided press state. In a case where the press state indicates that the image capture command button on the external device is being pressed, the communication control unit provides the control unit with the press state in response to receipt of the press state. In a case where the press state indicates that the image capture command button on the external device is not being pressed, the communication control unit provides the control unit with the press state after a predetermined time period elapses in response to receipt of the press state.

Further features will become apparent from the following description of an exemplary embodiment with reference to the attached drawings.

DESCRIPTION OF THE EMBODIMENTS

An exemplary embodiment will be described below in detail with reference to the accompanying drawings.

It is understood that the embodiment described below is merely an example, and various modifications and changes can be made thereto depending on the configuration and/or various conditions of the device to which the present disclosure is applied. In addition, the components of respective embodiments can be combined in any manner.

First Embodiment

<Configuration of Digital Camera>

Figure 1A:
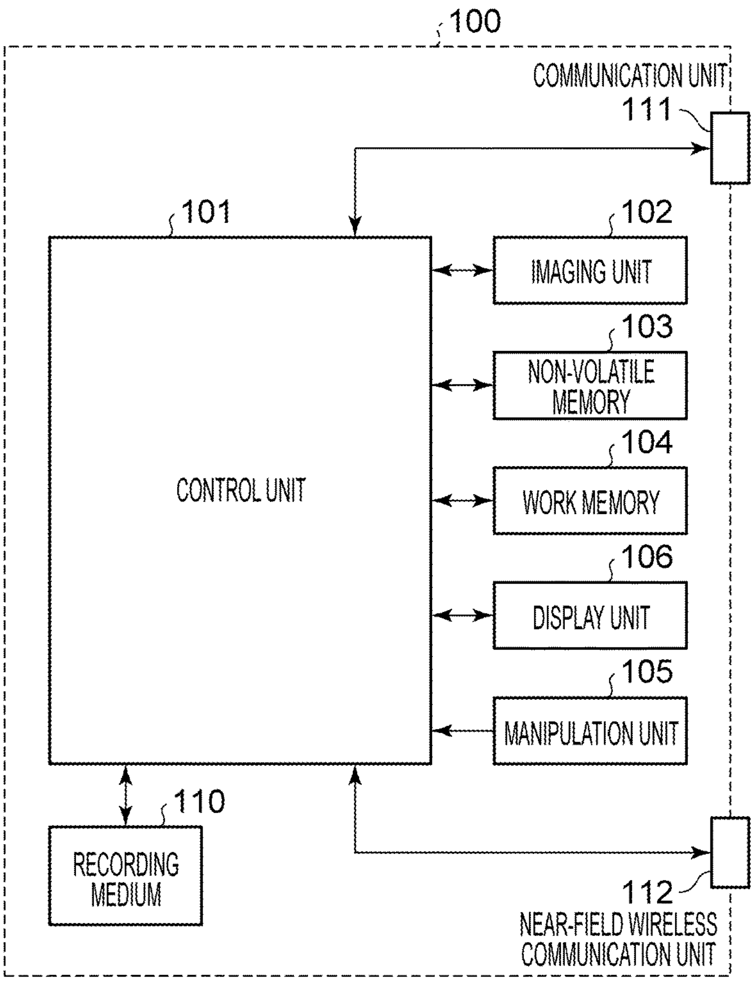
FIG. 1A is a block diagram illustrating a digital camera according to a first embodiment.

FIG. 1A is a block diagram illustrating an example configuration of a digital camera 100, which is an example of an imaging device of this embodiment. Although the description below will focus on a digital camera as an example of the imaging device, the imaging device is not limited thereto. For example, the imaging device can be a portable media player, an information processing device, such as a "tablet" device, a personal computer, or the like.

As illustrated in FIG. 1A, the digital camera 100 includes a control unit 101, an imaging unit 102, a non-volatile memory 103, a work memory 104, a manipulation unit 105, a display unit 106, a recording medium 110, a communication unit 111, and a near-field wireless communication unit 112. The control unit 101 controls an input signal, as well as components of the digital camera 100 according to a program described below. Instead of using the control unit 101 that controls the entire device, multiple pieces of hardware can be used to share the processes to control the entire device.

The imaging unit 102 includes, for example, an optical system for controlling an optical lens unit and operations related to the stop, zooming, and focusing, and an imaging element for converting light (image) received through the optical lens unit into an electrical image signal. The imaging element is typically a complementary metal oxide semiconductor (CMOS) or a charge coupled device (CCD). The imaging unit 102 is controlled by the control unit 101 such that object light formed by a lens included in the imaging unit 102 is converted by the imaging element into an electrical signal, to which a noise reduction process and/or the like are then performed, and the resultant digital data is output as image data. The digital camera 100 of this embodiment records the image data on the recording medium 110 according to Design rule for Camera File system (DCF) standard.

The non-volatile memory 103 is an electrically erasable and recordable non-volatile memory, and stores a program described below executed by the control unit 101, and the like.

The work memory 104 is used, for example, as a buffer memory for temporarily holding image data captured by the imaging unit 102, a memory for displaying an image on the display unit 106, and/or a work area of the control unit 101.

The manipulation unit 105 is used for receiving, from a user, an instruction on the digital camera 100. The manipulation unit 105 includes, for example, a power switch (or power button) for the user to instruct power on/off of the digital camera 100, a release switch for the user to instruct image capturing, and a reproduction button for the user to instruct reproduction of image data. The manipulation unit 105 also includes an operation member, such as a dedicated connection button for starting communication with an external device via the communication unit 111 described below. The manipulation unit 105 also includes a touch panel formed on the display unit 106 described below. The release switch includes a switch 1 (SW1) and a switch 2 (SW2). A "half press" position of the release switch causes SW1 to close to receive an instruction on processing to get ready for image capturing, such as autofocus (AF) processing, automatic exposure (AE) processing, automatic white balance (AWB) processing, and preliminary light emission (pre-flashing or EF) processing. A "full press" position of the release switch causes SW2 to close to receive an instruction to capture an image.

The display unit 106 is used for displaying a viewfinder image upon capturing an image, for displaying captured image data, for displaying text for an interactive operation, and for other process. The display unit 106 does not necessarily need to be integrated with the digital camera 100. The digital camera 100 can be connected to a display unit 106 internally or externally provided, and it is thus sufficient that the digital camera 100 at least have a capability of controlling the display on the display unit 106.

The recording medium 110 can record image data output from the imaging unit 102. The recording medium 110 can be detachably attached to the digital camera 100, or integrated with the digital camera 100. It is thus sufficient that the digital camera 100 at least have a unit for accessing the recording medium 110.

The communication unit 111 is an interface for establishing a connection with an external device. The digital camera 100 of the present embodiment exchanges data with an external device through the communication unit 111. For example, image data generated by the imaging unit 102 can be sent to an external device through the communication unit 111. In the present embodiment, the communication unit 111 includes an interface to communicate with an external device using a "wireless LAN" compliant to the IEEE 802.11 standard. The control unit 101 provides wireless communication with an external device by controlling the communication unit 111. The communication scheme is not limited to a wireless LAN, and can also be, for example, an infrared communication scheme.

The near-field wireless communication unit 112 includes, for example, an antenna for wireless communication, a modulator-demodulator (modem) circuit for processing a wireless signal, and a communication controller. The near-field wireless communication unit 112 provides near-field wireless communication compliant to the IEEE 802.15 standard (Bluetooth®) by outputting a modulated wireless signal from the antenna, and demodulating the wireless signal received by the antenna. Bluetooth communication as used in this embodiment is Bluetooth low energy version 4.0, which achieves a low power consumption. Bluetooth communication as described herein has a shorter communication range, i.e., shorter communication distance, than wireless LAN communication. In addition, Bluetooth communication is slower in speed than wireless LAN communication. Bluetooth communication however, consumes less power than wireless LAN communication.

In the present embodiment, the communication provided by the communication unit 111 is faster in speed than the communication provided by the near-field wireless communication unit 112 described below. In addition, the communication provided by the communication unit 111 includes a wider communication range than the communication provided by the near-field wireless communication unit 112. The short communication range of the communication provided by the near-field wireless communication unit 112 can limit the device to communicate with, thereby eliminating the need for processes including encryption key exchanging required in the communication provided by the communication unit 111. This means that communication can be provided more easily than the communication provided by using the communication unit 111.

The communication unit 111 of the digital camera 100 according to the present embodiment includes an access point (AP) mode to operate as an access point in an infrastructure mode, and a client (CL) mode to operate as a client in the infrastructure mode. The communication unit 111 operating in the CL mode enables the digital camera 100 according to the present embodiment to operate as a CL device in the infrastructure mode. When the digital camera 100 operates as a CL device, connecting the digital camera 100 to a peripheral AP device can connect the digital camera 100 to the network formed by that AP device. The communication unit 111 operating in the AP mode enables the digital camera 100 according to the present embodiment to operate also as a simpler AP (hereinafter referred to as "simplified AP") having limited functions, although the digital camera 100 is a kind of an access point in itself. The digital camera 100 operating as a simplified AP forms a network by itself, and a device in the vicinity of the digital camera 100 identifies the digital camera 100 as an AP device, and can thus connect itself to the network formed by the digital camera 100. As described above, the program for operating the digital camera 100 is stored in the non-volatile memory 103.

The digital camera 100 according to the present embodiment functions as a kind of an AP, but is a simplified AP without a gateway function to transfer data received from a CL device to an Internet provider or the like. Accordingly, the digital camera 100 cannot transfer data received by a device connected to the network formed by the digital camera 100 to another network, such as the Internet.

Figure 1B:
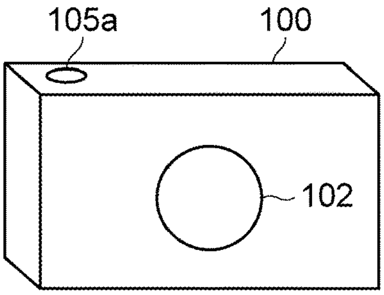
FIGS. 1B and 1C are external views of the digital camera according to the first embodiment.
Figure 1C:
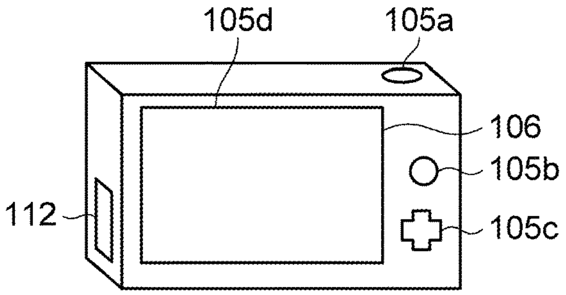

An appearance of the digital camera 100 will next be described. FIGS. 1B and 1C each illustrate an example of appearance of the digital camera 100. The manipulation unit 105 described above includes operation members such as a release switch 105*a*, a reproduction button 105*b*, a direction key 105*c*, and a touch panel 105*d*. The display unit 106 displays an image obtained by an image capturing process of the imaging unit 102.

The digital camera 100 according to this embodiment includes a normal shooting mode and a bulb shooting mode. In the normal shooting mode, the digital camera 100 automatically determines an exposure time. In the bulb shooting mode, the exposure continues as long as the release switch 105*a* is pressed. A user can select either the normal shooting mode or the bulb shooting mode through menu manipulation.

The foregoing description has been provided in terms of the digital camera 100.

<Internal Configuration of Remote Control Unit>

Figure 2:
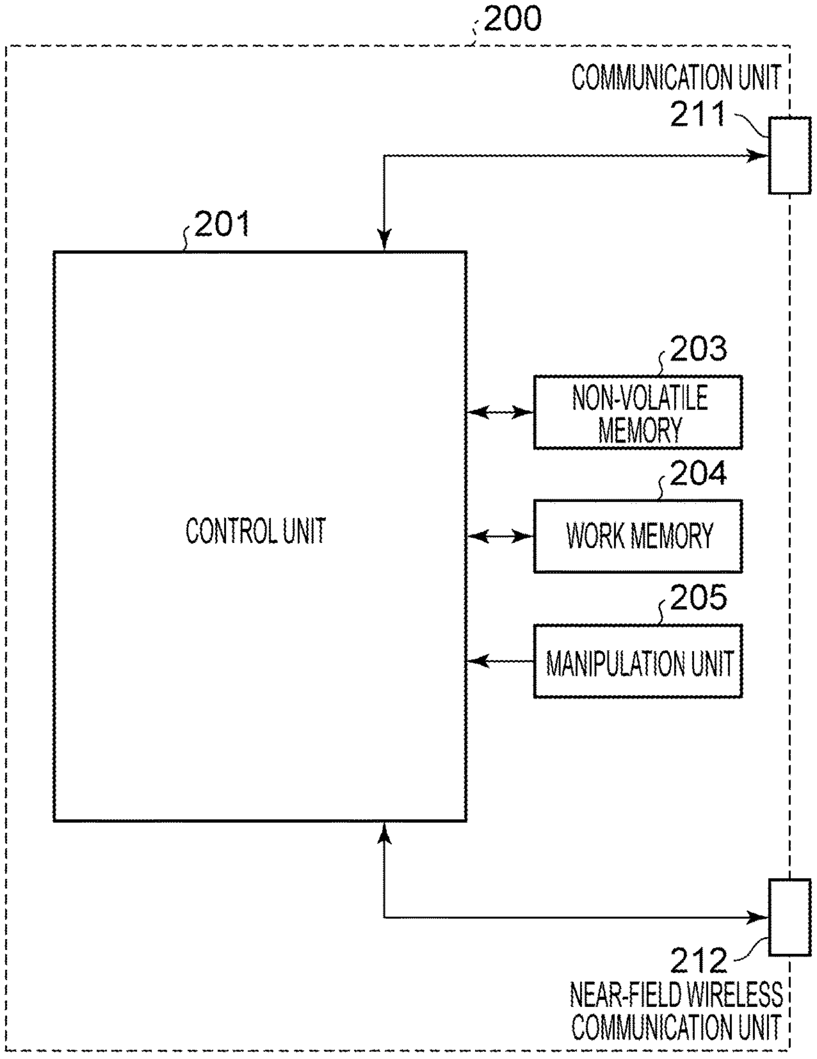
FIG. 2 is a block diagram illustrating a configuration of a remote control unit according to the first embodiment.

FIG. 2 is a block diagram illustrating an example configuration of a remote control unit 200, which is an example of the remote device (external device) of the present embodiment. The remote device is described herein using a remote control unit as an example, but the remote device is not limited thereto. For example, the remote device can also be a mobile phone, a digital camera, a tablet device, or a personal computer including a wireless function.

As illustrated in FIG. 2, the remote control unit 200 includes a control unit 201, a non-volatile memory 203, a work memory 204, a manipulation unit 205, a communication unit 211, and a near-field wireless communication unit 212. The control unit 201 controls an input signal, as well as components of the remote control unit 200 according to a program described below. Instead of using the control unit 201 that controls the entire device, multiple pieces of hardware can be used to share the processes to control the entire device.

The non-volatile memory 203 is an electrically erasable and recordable non-volatile memory. The non-volatile memory 203 stores basic software executed by the control unit 201.

The work memory 204 is used, for example, as a memory for displaying an image on the display unit 206, and/or a work area of the control unit 201.

The manipulation unit 205 is used for receiving, from a user, an instruction on the remote control unit 200. The manipulation unit 205 includes, for example, a release button for receiving an instruction to capture an image using the imaging unit 102 of the digital camera 100, and an AF button for receiving an instruction to perform focusing. The manipulation unit 205 also includes a zoom-in button and a zoom-out button for adjusting the zoom ratio to adjust the angle of view.

The near-field wireless communication unit 212 includes, for example, an antenna for wireless communication, a modulator-demodulator (modem) circuit for processing a wireless signal, and a communication controller. The near-field wireless communication unit 212 provides near-field wireless communication compliant to the IEEE 802.15 standard by outputting a modulated wireless signal from the antenna, and demodulating the wireless signal received by the antenna. In the present embodiment, the near-field wireless communication unit 112 communicates with other devices in compliance with the IEEE 802.15.1 standard (Bluetooth®). The Bluetooth communication as used in the present embodiment is Bluetooth low energy version 4.0, which achieves a low power consumption.

The foregoing description has been provided in terms of the remote control unit 200.

<Sequence in System>

A sequence for activating the digital camera 100 using the remote control unit 200 in a system including the digital camera 100 and the remote control unit 200 will now be described.

Figure 3:
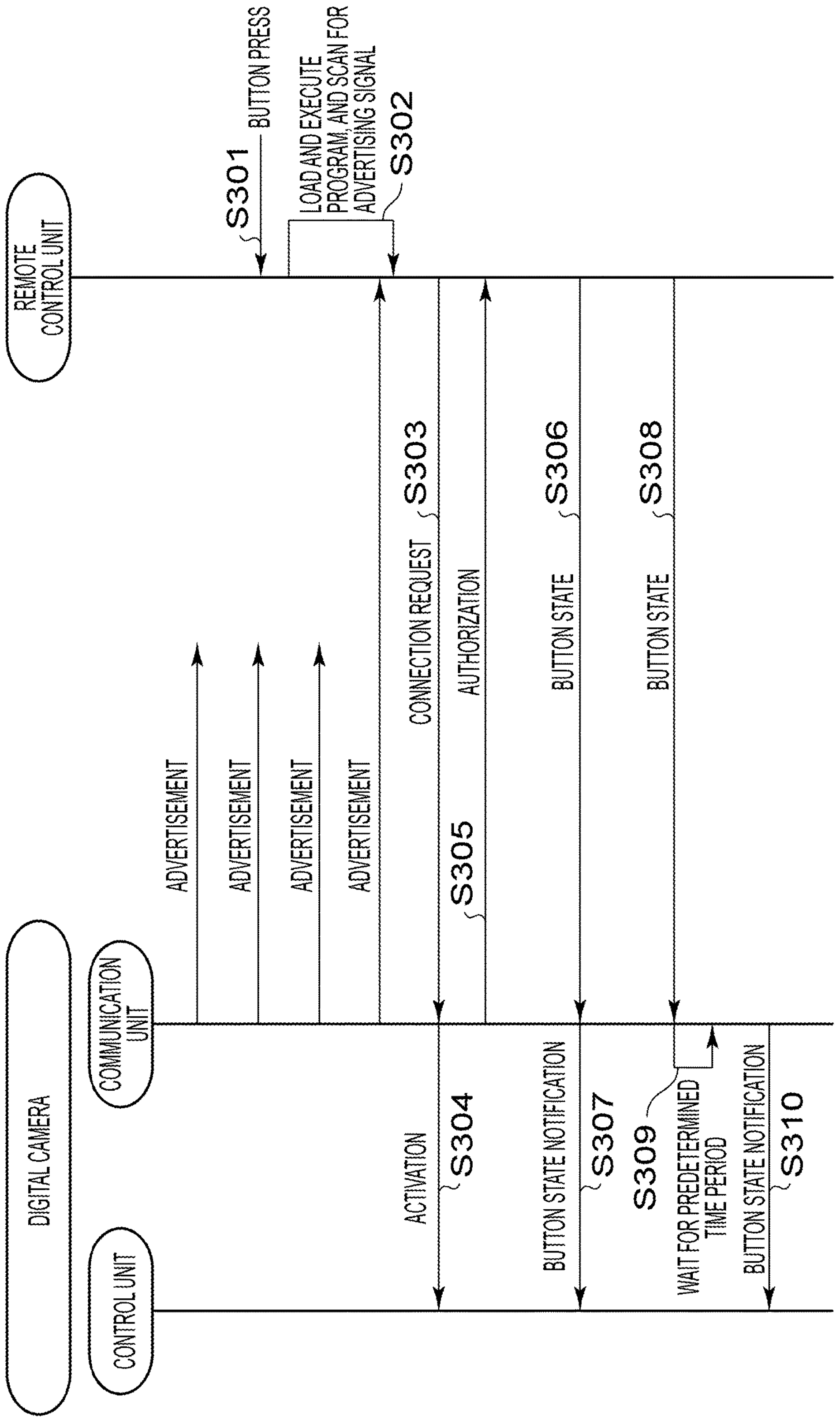
FIG. 3 is a sequence diagram of a system including the digital camera and the remote control unit according to the first embodiment.

FIG. 3 is a sequence diagram of a remote camera system according to the present embodiment. The sequence of FIG. 3 begins with broadcasting of Bluetooth low energy advertising signals by the digital camera 100. The near-field wireless communication unit 112 of the digital camera 100 can previously be activated/deactivated through menu manipulation. The example herein assumes that the near-field wireless communication unit 112 has been activated.

First, at sequence step S301, the user presses any button of the remote control unit 200. This operation causes the control unit 201 of the remote control unit 200 to be activated.

At sequence step S302, the control unit 201 loads the program from the non-volatile memory 203, launches the program, and performs scanning for an advertising signal through the near-field wireless communication unit 212. Thus, the remote control unit 200 receives an advertising signal broadcast by the digital camera 100.

Upon the receipt of an advertising signal, at sequence step S303, the remote control unit 200 sends a connection request to the digital camera 100 through the near-field wireless communication unit 212.

Upon receipt of the connection request, the communication unit 112 of the digital camera 100 activates the control unit 101. More specifically, at sequence step S304, the communication unit 112 sends an activation signal to the control unit 101 to start activation processing of the control unit 101. At sequence step S305, the digital camera 100 responds the connection request with authorization. Upon receipt of this response, the remote control unit 200 establishes a Bluetooth low energy connection with the digital camera 100.

Upon establishment of a Bluetooth low energy connection, at sequence step S306, the remote control unit 200 sends button operational state information to the digital camera 100. In this example, the remote control unit 200 sends operational state information of all the buttons provided on the remote control unit 200. For example, if the user is pressing the release button and is pressing no other buttons, information indicating both that the release button is being pressed and that the other buttons are not being pressed are sent. A press of a button on the remote control unit 200 causes the processing after sequence step S301 to be performed, but the user can release that button before sequence step S305. To avoid responding to such user operation, the control unit 201 stores information about which button has been pressed by the user for the activation, and sends information indicating that the button is being pressed even when that button is not being pressed at the time of performing sequence step S306.

Upon receipt of this information, at sequence step S307, the communication unit 112 informs the control unit 101 of the button state to enable the digital camera 100 to perform processing dependent on the button that has been pressed.

Then, at sequence step S308, the remote control unit 200 again sends button operational state information at the timing according to the connection interval. For example, suppose that the user has released the release button and thus no buttons are being pressed. In this situation, information indicating that no buttons are being pressed is sent. The information about the button pressed upon the activation is already sent at sequence step S306, and accordingly, the information about the button pressed upon the activation is not sent this time, but information of the current button operational state is sent.

Upon receipt of this information, at sequence step S309, the communication unit 112 waits for a predetermined time period. In this example, a fixed time period is used for this waiting time period. The reason why the communication unit 112 waits for such a time period rather than promptly providing notification is that the control unit 101 may be unable to be aware of the notification if the control unit 101 is informed of such change in button state at communication intervals of the communication unit 112. The predetermined time period of waiting can be variable, and can vary depending on the time duration of the press of the button being pressed and/or on the state of the control unit 101. For example, the remote control unit 200 can be configured to measure the time period from the start of the pressing of the button at sequence step S301 until the release of the button, and then send this information to the digital camera 100 at sequence step S308. This technique enables the digital camera 100 to wait as long as the time duration of the press of the button. Such sequence enables the digital camera 100 to be aware of a substantially same time as the time duration of the press of the release button by the user in a shooting technique based on the time duration of the press of the release button, such as bulb shooting. Thus, a more user-oriented operation can be provided.

<Operation of Remote Control Unit>

An operation of the remote control unit 200 will now be described.

Figure 4:
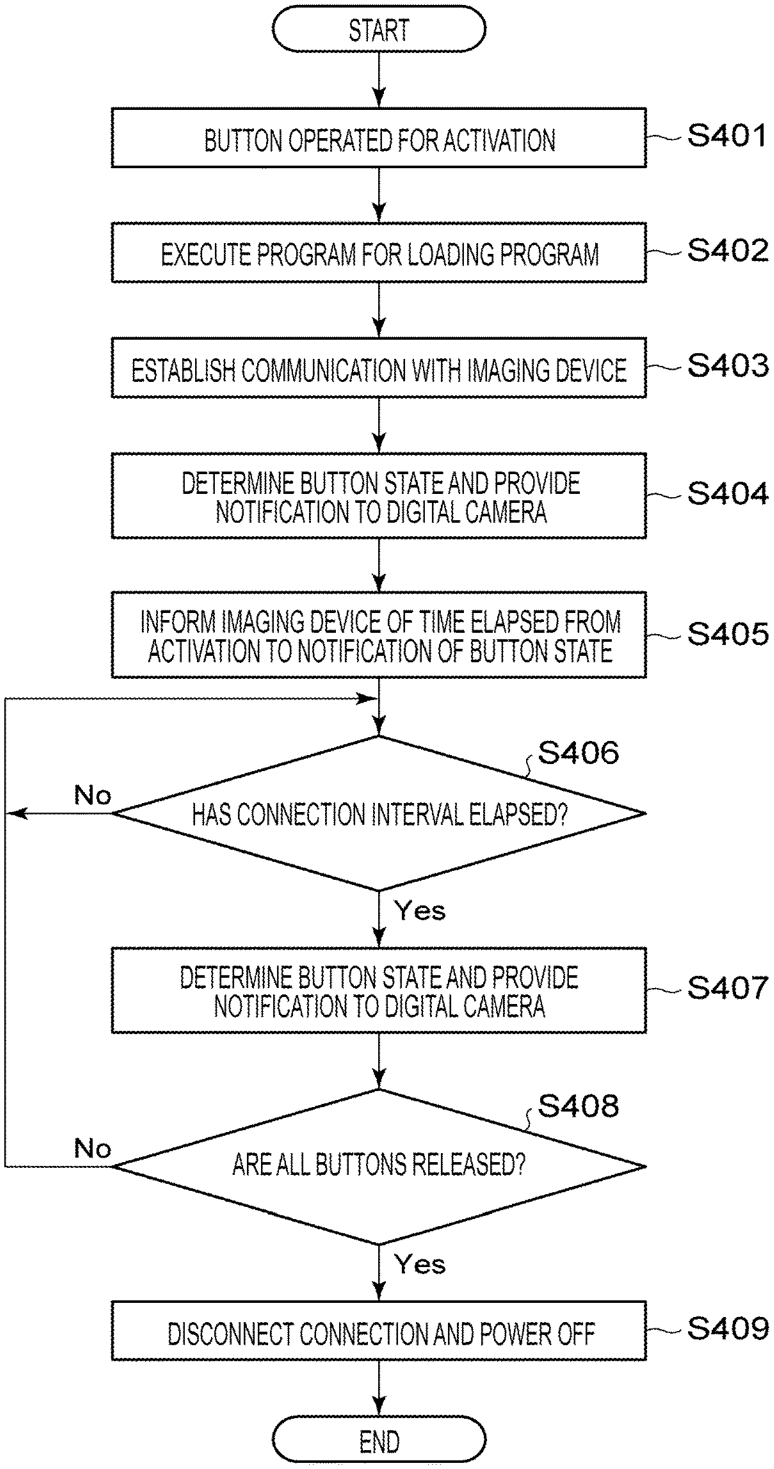
FIG. 4 is a flowchart illustrating an operation of the remote control unit according to the first embodiment.

FIG. 4 is a flowchart illustrating an operation of the remote control unit 200 for providing the sequence of FIG. 3.

First, at step S401, the control unit 201 of the remote control unit 200 detects a button operation performed by the user.

The control unit 201 is activated by the detected button operation. At step S402, the control unit 201 loads the program from the non-volatile memory 203, and executes the program. In this step, the control unit 201 records information about which button has been pressed for activation in an internal memory of the control unit 201 or in the work memory 204. The processing of this step corresponds to the processing at sequence step S302 of FIG. 3.

Then, at step S403, the control unit 201 performs scanning for an advertising signal from the digital camera 100, sends a connection request, receives a response for the request, and thus establishes Bluetooth low energy communication with the digital camera 100. The processing of this step corresponds to the processing at sequence steps S303 to S305 of FIG. 3.

Next, at step S404, the control unit 201 determines which button is being pressed, and informs the digital camera 100 of the button pressing state. In this processing, the button that has been pressed upon activation and recorded as such in an internal memory of the control unit 201 or in the work memory 204 at step S401 is regarded as being pressed regardless of the actual position, and information indicating that the button is being pressed is provided.

Then, at step S405, the control unit 201 informs the digital camera 100 of the time elapsed from step S401 to step S404 as a delay time.

Next, at step S406, the control unit 201 determines whether a connection interval of Bluetooth low energy has elapsed. A connection interval is a communication interval defined in the Bluetooth low energy standard. A pair of devices connected to each other using Bluetooth low energy periodically communicate with each other each time a communication interval elapses even when there is no need to exchange information. This connection interval is configured upon establishment of the Bluetooth low energy connection such that the devices share a predetermined time period. If the connection interval has elapsed, the process proceeds to step S407.

At step S407, the control unit 201 determines which button is being pressed, and informs the digital camera 100 of the button pressing state. In this processing, the information stored at step S401 is no longer used, and thus information of the current button state is used in the notification.

At step S408, the control unit 201 determines whether all the buttons are released. If all the buttons are released, the process proceeds to step S409, where the control unit 201 disconnects communication with the digital camera 100 and powers off the remote control unit 200. If at least one of the buttons is being operated, communication with the digital camera 100 continues and the processing from step S406 to step S408 is repeated.

<Operation of Digital Camera>

An operation of the digital camera 100 will next be described.

Figure 5:
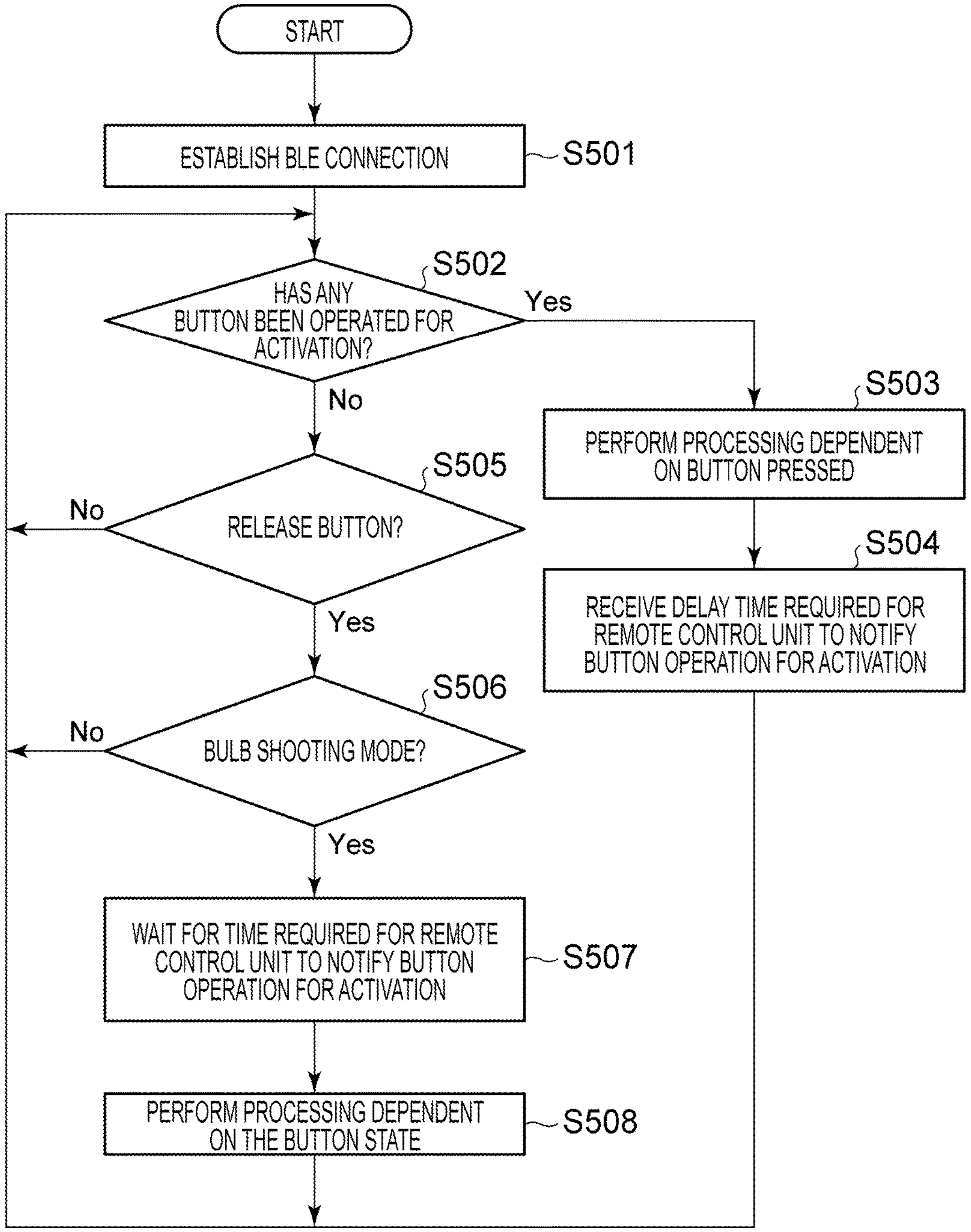
FIG. 5 is a flowchart illustrating an operation of the digital camera according to the first embodiment.

FIG. 5 is a flowchart illustrating an operation of the digital camera 100 for providing the sequence of FIG. 3. The process illustrated in this flowchart is performed by the communication unit 112 and the control unit 101 in collaboration.

First, at step S501, the communication unit 112 establishes a Bluetooth low energy connection with a remote control unit. Processing before establishment of the connection includes sending an advertising signal, receiving a connection request from the remote control unit having received the advertising signal, activating the control unit 101, and sending a response for the connection request. The processing of this step corresponds to the processing at sequence steps S303 to S305 of FIG. 3.

Then, at step S502, the communication unit 112 receives notification of the button state from the remote control unit to determine whether any button has been operated in an activating manner. If it is determined that a button has been operated in an activating manner, the process proceeds to step S503.

Then, at step S503, the communication unit 112 informs the control unit 101 of the button state, and the control unit 101 in turn performs processing depending on the button being pressed based on the notification received. For example, while the release button is being pressed, the imaging process continues. In parallel with step S503, at step S504, the control unit 101 receives delay time information sent from the remote control unit at step S405 of FIG. 4, after which the process returns to step S502.

At step S502, if it is determined that a button has been operated in a deactivating manner, the process proceeds to step S505.

At step S505, the communication unit 112 determines whether the button operated in a deactivating manner is the release button. If it is determined that the button operated in a deactivating manner is not the release button, the communication unit 112 informs the control unit 101 of the button state, and the process returns to step S502. If it is determined that such button is the release button, the process proceeds to step S506.

At step S506, the communication unit 112 determines whether the current shooting mode of the digital camera 100 is the bulb shooting mode. If it is determined that the current shooting mode is not the bulb shooting mode, the communication unit 112 informs the control unit 101 of the button state, and the process returns to step S502. If it is determined that the current shooting mode is the bulb shooting mode, the process proceeds to step S507.

At step S507, the communication unit 112 waits for a time period based on the delay time received at step S502. After this time period elapses, the communication unit 112 informs the control unit 101 of the button state.

At step S508, upon receipt of the notification of the button state containing information that indicates that a button has been operated in a deactivating manner, the control unit 101 performs processing depending on the button state. For example, in a case of bulb shooting, the shutter is closed, which was opened upon receipt of the notification indicating that the button had been operated in an activating manner.

The embodiment has described controlling the timing of notification of button operation to enable a control unit to be aware of a change between “on” and “off” as the button is operated on a remote control unit. This technique reduces a probability of causing an unintended operation by a user.

The digital camera of the above-described embodiment waits for notification of deactivation operation of the applicable button for a predetermined time period in a case of bulb shooting. A similar process can be applied to a shooting operation requiring the applicable button to be left pressed, such as, for example, continuous shooting.

While the above-described embodiment discusses separating the processing depending on the shooting mode with respect to whether to introduce a wait time for notification, the notification of deactivation operation of the applicable button can be delayed for a predetermined time period in all shooting modes.

For simplicity of explanation, the above embodiment was described in terms of the relationship between the communication unit 112 and the control unit 101. A digital camera can include multiple control units, i.e., a second control unit can be provided between the communication unit 112 and the control unit 101. In this case, the digital camera can be configured such that the notification of button state from the communication unit 112 is first received by the second control unit, which in turn transfers the information of button state to the control unit 101. In this example, it may be the second control unit, rather than the communication unit 112, that performs the determination and/or waiting process of FIG. 5.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-233253, filed Nov. 30, 2016, which is hereby incorporated by reference herein in its entirety.

What is claimed is:

1. An imaging device comprising:

an imaging unit;

one or more processors; and a communication interface including an antenna and a communication controller;

wherein the communication controller receives information of a press state of an image capture command button from an external device via the antenna, then the communication controller provides the one or more processors with the press state, wherein the one or more processors control an imaging process that uses the imaging unit based on the provided press state, wherein, in a case where the received information of the press state indicates that the image capture command button on the external device is being pressed, the communication controller provides the one or more processors with the press state in response to receipt of the information of the press state from the external device, and wherein, in a case where the received information of the press state indicates that the image capture command button on the external device is not being pressed, the communication controller provides the one or more processors with the press state after a predetermined time period elapses in response to receipt of the information of the press state from the external device.

2. The imaging device according to claim 1, wherein upon receipt, from the communication controller, of information indicating that the image capture command button on the external device is being pressed in a situation in which the imaging process is not performed, the one or more processors provides control to start the imaging process.

3. The imaging device according to claim 1, wherein upon receipt, from the communication controller, of information indicating that the image capture command button on the external device is not being pressed, the one or more processors provides control to stop the imaging process.

4. The imaging device according to claim 1, wherein the imaging process is continued during a predetermined time period until the one or more processors are provided with the press state.

5. The imaging device according to claim 1, further comprising:

an image capture button, wherein the one or more processors provides control to start the imaging process in response to detection of a press of the image capture button without receipt of the information of the press state.

6. The imaging device according to claim 1, wherein upon receipt of a connection request from the external device, the communication controller provides control to activate the one or more processors.

7. The imaging device according to claim 1, wherein the communication controller controls communication with the external device according to a communication protocol compliant with Bluetooth low energy.

8. The imaging device according to claim 1, wherein the communication controller causes the communication unit to periodically broadcast an advertising signal.

9. The imaging device according to claim 1, wherein the imaging device includes a plurality of image capture modes, and wherein in a case where the information of the press state indicates that the image capture command button on the external device is not being pressed, the communication controller selects, based on a current image capture mode from among the plurality of image capture modes, either to provide the one or more processors with the press state after the predetermined time period elapses or to provide the one or more processors with the press state without waiting for the predetermined time period to elapse.

10. The imaging device according to claim 1, wherein the imaging device includes a plurality of image capture modes, and wherein in a case where the press state indicates that the image capture command button on the external device is not being pressed, the communication controller provides the one or more processors with the press state after the predetermined time period elapses regardless of a current image capture mode from among the plurality of image capture modes.

11. A method for controlling an imaging device including an imaging unit, one or more processors, and a communication interface including an antenna and a communication controller, the method comprising:

receiving information of a press state of an image capture command button from an external device via the antenna; and controlling an imaging process based on the received press state, wherein, in a case where the received information of the press state indicates that the image capture command button on the external device is being pressed, the press state is provided to the one or more processors in response to receipt of the information of the press state from the external device, and wherein, in a case where the received information of the press state indicates that the image capture command button on the external device is not being pressed, the press state is provided to the one or more processors after a predetermined time period elapses in response to receipt of the information of the press state from the external device.

12. The method according to claim 11, wherein upon receipt, from the communication controller, of information indicating that the image capture command button on the external device is being pressed in a situation in which the imaging process is not performed, the one or more processors provide control to start the imaging process.

13. The method according to claim 11, wherein upon receipt, from the communication controller, of information indicating that the image capture command button on the external device is not being pressed, the one or more processors provide control to stop the imaging process.

14. The method according to claim 11, wherein the imaging process is continued during a predetermined time period until the one or more processors are provided with the press state.

15. The method according to claim 11, wherein upon receipt of a connection request from the external device, the communication controller provides control to activate the one or more processors.

16. A non-transitory computer-readable storage medium which stores a program for causing an imaging device that includes an imaging unit, one or more processors, and a communication interface including an antenna and a communication controller, to execute a method, the method comprising:

receiving information of a press state of an image capture command button from an external device via the antenna; and controlling an imaging process based on the received press state, wherein, in a case where the received information of the press state indicates that the image capture command button on the external device is being pressed, the press state is provided to the one or more processors in response to receipt of the information of the press state from the external device, and wherein, in a case where the received information of the press state indicates that the image capture command button on the external device is not being pressed, the press state is provided to the one and more processors after a predetermined time period elapses in response to receipt of the information of the press state from the external device.

17. The non-transitory computer-readable storage medium according to claim 16, wherein upon receipt, from the communication controller, of information indicating that the image capture command button on the external device is being pressed in a situation in which the imaging process is not performed, the one or more processors provide control to start the imaging process.

18. The non-transitory computer-readable storage medium according to claim 16, wherein upon receipt, from the communication controller, of information indicating that the image capture command button on the external device is not being pressed, the one or more processors provide control to stop the imaging process.

19. The non-transitory computer-readable storage medium according to claim 16, wherein the imaging process is continued during a predetermined time period until the one or more processors are provided with the press state.

20. The non-transitory computer-readable storage medium according to claim 16, wherein upon receipt of a connection request from the external device, the communication controller provides control to activate the one or more processors.

* * * * *